(12) United States Patent
Sahin et al.

(10) Patent No.: US 11,520,486 B2
(45) Date of Patent: Dec. 6, 2022

(54) USING A SMART NETWORK INTERFACE CONTROLLER WITH STORAGE SYSTEMS

(71) Applicant: EMC IP Holding Company LLC, Hopkinton, MA (US)

(72) Inventors: Adnan Sahin, Needham, MA (US); Douglas E. LeCrone, Hopkinton, MA (US); Ian Wigmore, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 45 days.

(21) Appl. No.: 16/687,791

(22) Filed: Nov. 19, 2019

(65) Prior Publication Data
US 2021/0149567 A1 May 20, 2021

(51) Int. Cl.
*G06F 3/06* (2006.01)
*G06F 11/14* (2006.01)

(52) U.S. Cl.
CPC ............ *G06F 3/0619* (2013.01); *G06F 3/067* (2013.01); *G06F 3/0658* (2013.01); *G06F 3/0659* (2013.01); *G06F 3/0664* (2013.01); *G06F 11/1464* (2013.01); *G06F 11/1469* (2013.01)

(58) Field of Classification Search
CPC ......... G06F 13/4221; G06F 2213/3808; G06F 2221/0788; G06F 3/0619; G06F 3/067; G06F 11/1464; G06F 3/0664; G06F 3/0659; G06F 3/0658; G06F 11/1469; G06F 3/0655; G06F 11/1402; G06F 11/1458; G06F 3/0614
See application file for complete search history.

(56) References Cited

U.S. PATENT DOCUMENTS

| | | | | |
|---|---|---|---|---|
| 5,742,792 A * | 4/1998 | Yanai | ...................... | H04L 69/40 714/763 |
| 7,308,528 B2 * | 12/2007 | Kitamura | .............. | G06F 3/0607 711/111 |
| 2004/0153614 A1 * | 8/2004 | Bitner | ................... | G06F 3/0604 711/162 |
| 2005/0108486 A1 * | 5/2005 | Sandorfi | ............. | G06F 11/1456 711/162 |
| 2005/0138040 A1 * | 6/2005 | Lamb | .................. | H04L 67/1097 |

(Continued)

*Primary Examiner* — Larry T Mackall
(74) *Attorney, Agent, or Firm* — Muirhead and Saturnelli, LLC

(57) ABSTRACT

A backup data storage system includes non-volatile memory units, a disk interface coupled to at least some of the non-volatile memory units, a connection component that facilitates exchanging data with the backup data storage system, and a smart network interface controller, coupled to the disk interface and the connection component to provide tape emulation to a host coupled to the backup data storage system. The disk interface, the connection component, and the smart network interface controller may be coupled using a PCIe bus. Tape data written to the backup storage device may be stored on the non-volatile memory units. A processor coupled to the smart network interface controller and the disk interface may receive the data from the smart network interface controller and may provide the data to the disk interface to store the data on the non-volatile memory units. The connection component may be a FICON connection component.

17 Claims, 5 Drawing Sheets

(56) References Cited

U.S. PATENT DOCUMENTS

| | | | | |
|---|---|---|---|---|
| 2006/0007576 A1* | 1/2006 | Georgis | ............... | G06F 3/0607 |
| | | | | 360/69 |
| 2006/0010286 A1* | 1/2006 | Topham | .............. | G06F 11/1464 |
| | | | | 711/111 |
| 2009/0313447 A1* | 12/2009 | Nguyen | .............. | G06F 9/45558 |
| | | | | 711/162 |
| 2010/0049929 A1* | 2/2010 | Nagarkar | ............ | G06F 11/1415 |
| | | | | 711/162 |
| 2010/0180074 A1* | 7/2010 | Slater | ................... | G06F 3/0664 |
| | | | | 711/111 |
| 2012/0079325 A1* | 3/2012 | Riegel | ................ | G06F 11/3457 |
| | | | | 714/E11.029 |
| 2017/0052735 A1* | 2/2017 | Katori | ................ | G06F 13/4068 |
| 2020/0259799 A1* | 8/2020 | Li | .......................... | H04L 63/20 |
| 2020/0401905 A1* | 12/2020 | Hwang | ................... | G06N 5/02 |

\* cited by examiner

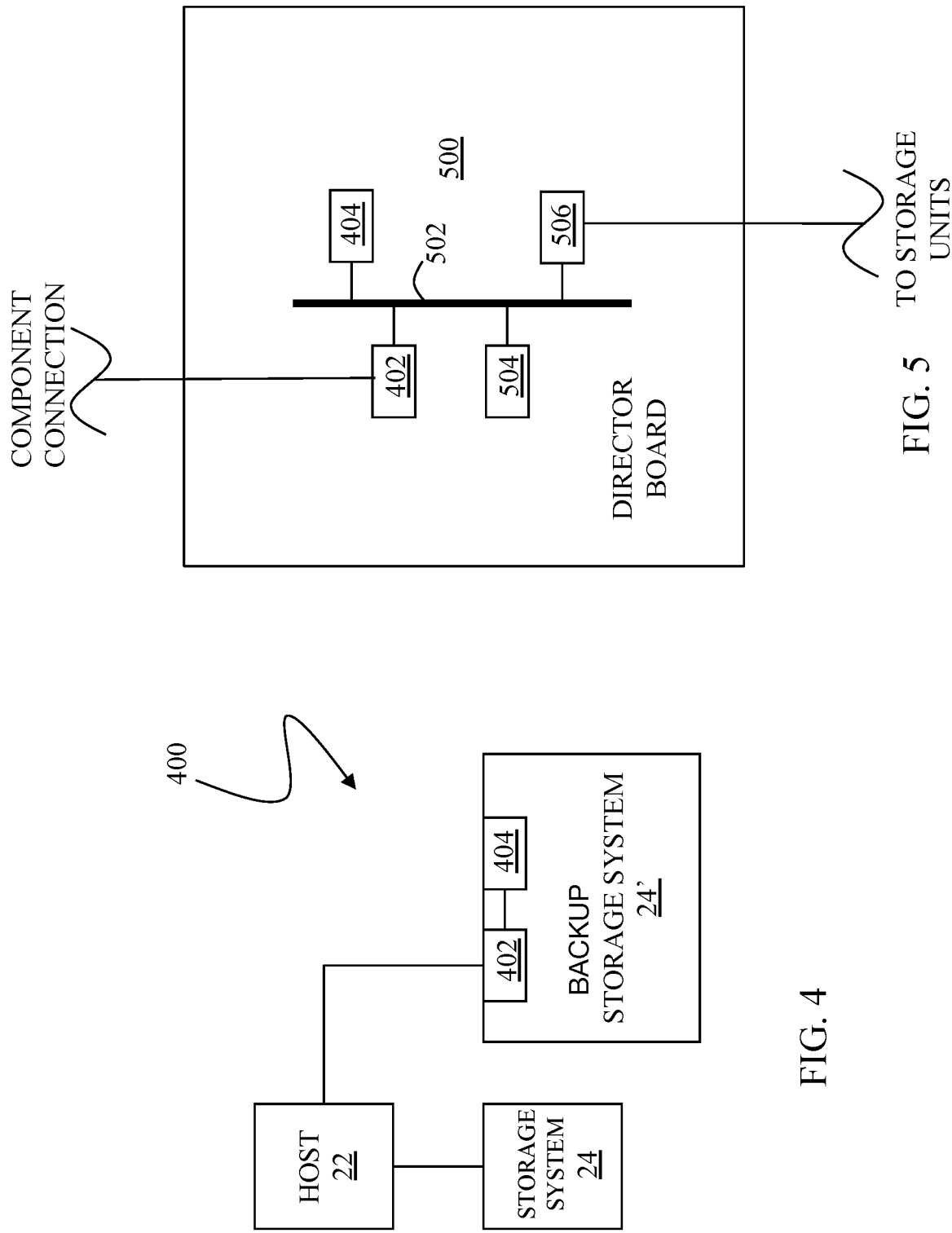

USING A SMART NETWORK INTERFACE CONTROLLER WITH STORAGE SYSTEMS

TECHNICAL FIELD

This application relates to the field of computer systems and storage systems therefor and, more particularly, to the field of using a smart network interface controller with storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

In some cases, it is desirable to provide alternative storage that may be used, for example, to provide backup storage. Tape devices have been used for backup storage; many applications that back up data to tape devices are still in use. However, in many instances, no actual tape drive devices are used. Instead, a virtual tape drive device, such as the DLm 8500 provided by Dell EMC, is used in place of an actual tape drive device. A virtual tape drive device uses a plurality of components, including a front end component, a data mover component, and a conventional storage system, that work together to emulate an actual tape drive. Applications that were written to interact with tape drive devices access a virtual tape drive device without needing any modification.

A drawback to virtual tape drive devices and other backup solutions is that, sometimes, many components are needed. For example, a virtual tape drive may use a front end component, a data mover component, and a conventional storage system even though, in the end, it is the storage of the data in the storage system that provides the backup functionality. Similarly, other backup solutions may require specialty software or additional components to operate, which adds complexity and cost.

Accordingly, it is desirable to provide a mechanism that facilitates transferring data to backup storage without requiring additional or alternative software and/or hardware components and that add complexity and cost.

SUMMARY OF THE INVENTION

According to the system described herein, a backup data storage system includes non-volatile memory units, a disk interface coupled to at least some of the non-volatile memory units, a connection component that facilitates exchanging data with the backup data storage system, and a smart network interface controller, coupled to the disk interface and the connection component to provide tape emulation to a host coupled to the backup data storage system. The disk interface, the connection component, and the smart network interface controller may be coupled using a PCIe bus. Tape data written to the backup storage device may be stored on the non-volatile memory units. A processor coupled to the smart network interface controller and the disk interface may receive the data from the smart network interface controller and may provide the data to the disk interface to store the data on the non-volatile memory units. The data may be transferred directly between the smart network interface controller and the disk interface using P2P protocol that transfers data using a PCIe bus. The smart network interface controller may include a system on a chip having a processor, memory, and non-volatile storage. The smart network interface controller may be a BlueField® SmartNIC device provided by Mellanox Technologies of Sunnnyvale Calif. The connection component may be a FICON connection component.

According further to the system described herein, a storage system includes a connection component that facilitates exchanging data with the storage system and a smart network interface controller, coupled to the connection component to exchange data provided to the storage system with a backup storage system coupled to the storage system. The exchange exclusively uses only one or more processors that are provided as part of the smart network interface controller. The smart network interface controller may cause the connection controller to present two logical interfaces to a host coupled to the storage system. One of the interfaces may emulate a tape drive. Data exchanged with the one of the interfaces that emulates a tape drive may also be exchanged with the backup storage system. The smart network interface controller may include a system on a chip having a processor, memory, and non-volatile storage. The smart network interface controller may be a BlueField® SmartNIC device provided by Mellanox Technologies of Sunnnyvale Calif. The connection component may be a FICON connection component.

According further to the system described herein, a storage system includes a connection component that facilitates exchanging data with the storage system and a smart network interface controller, coupled to the connection component to exchange data provided to the storage system with a cloud storage system coupled to the storage system. The exchange exclusively uses only one or more processors that are provided as part of the smart network interface controller. The smart network interface controller may cause the connection controller to present two logical interfaces to a host coupled to the storage system. One of the interfaces may emulate a tape drive. Data exchanged with the one of the interfaces that emulates a tape drive may be exchanged with the cloud storage system. The smart network interface controller may include a system on a chip having a processor, memory, and non-volatile storage.

BRIEF DESCRIPTION OF THE DRAWINGS

Embodiments of the system are described with reference to the several figures of the drawings, noted as follows.

FIG. 4 is a schematic diagram showing a host, a storage system, and a backup storage system according to an embodiment of the system described herein.

FIG. 5 is a schematic diagram of a director board having a smart network interface according to an embodiment of the system described herein.

DETAILED DESCRIPTION OF VARIOUS EMBODIMENTS

The system described herein provides a mechanism that facilitates transferring data to and from a storage system to other storage systems and/or to and from cloud storage in a way that reduces complexity and potentially allows existing components to adapt without needing to provide different or additional software and/or hardware.

Figure 1:
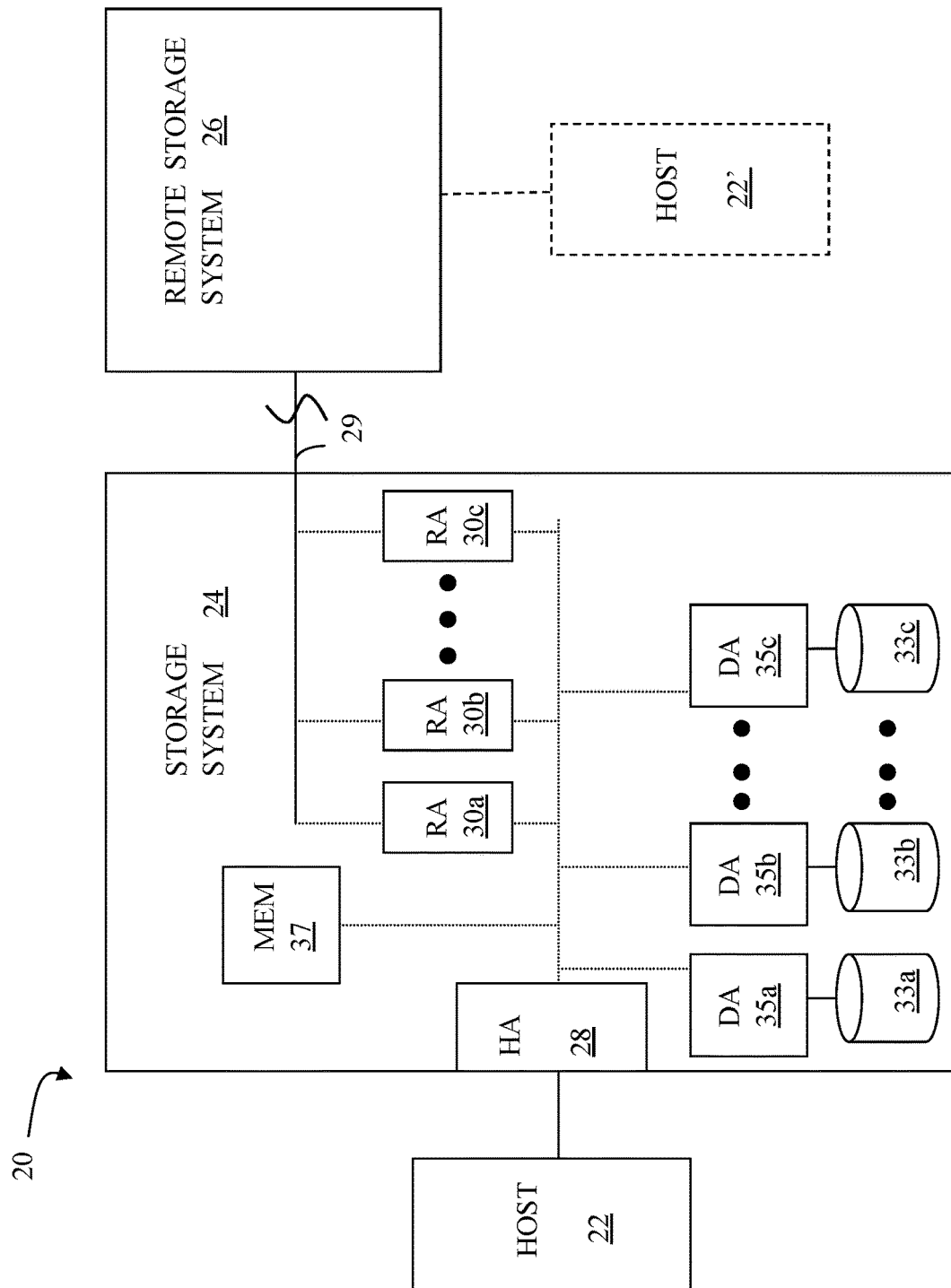
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c. Data may be initially staged in the memory 37 prior to being written to the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
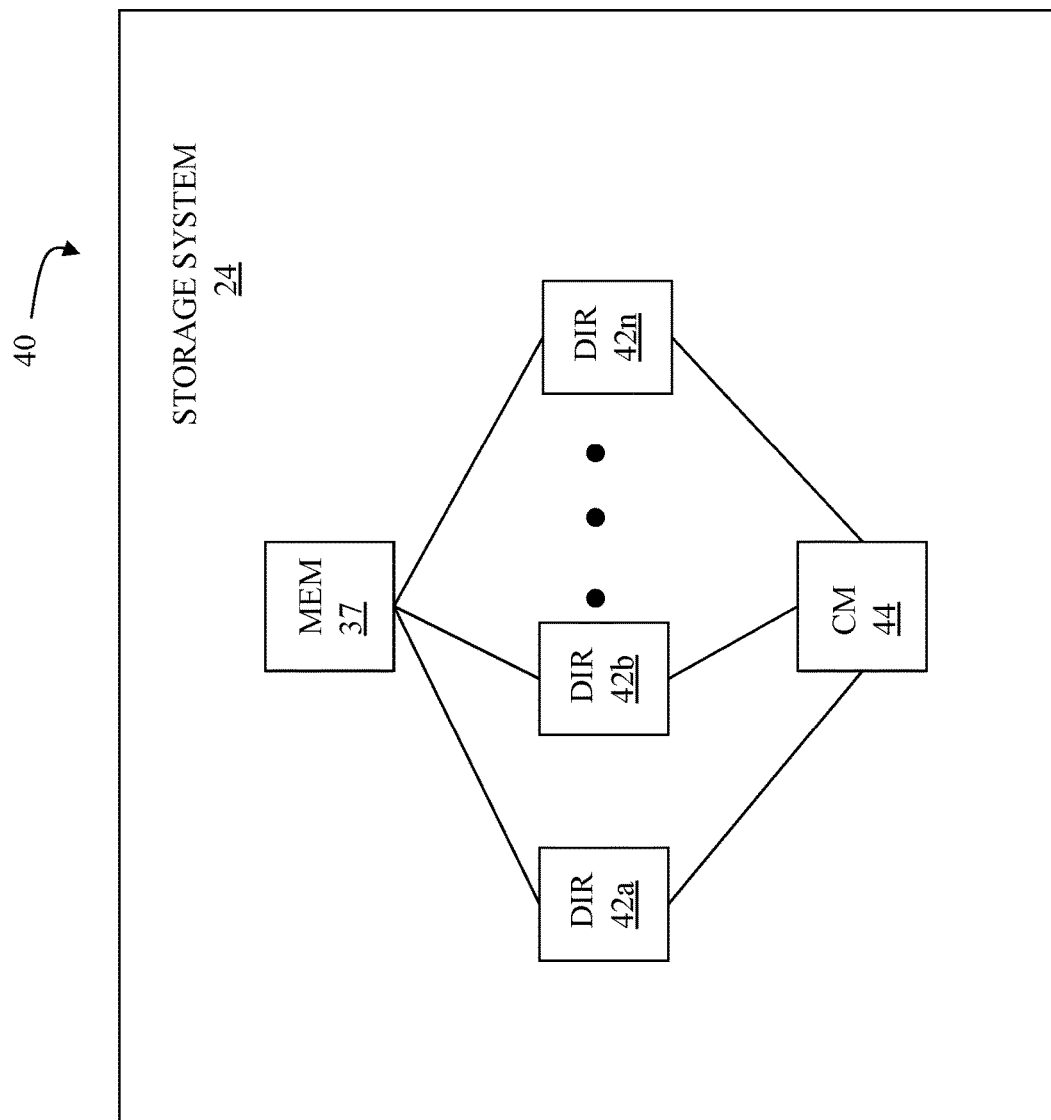
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
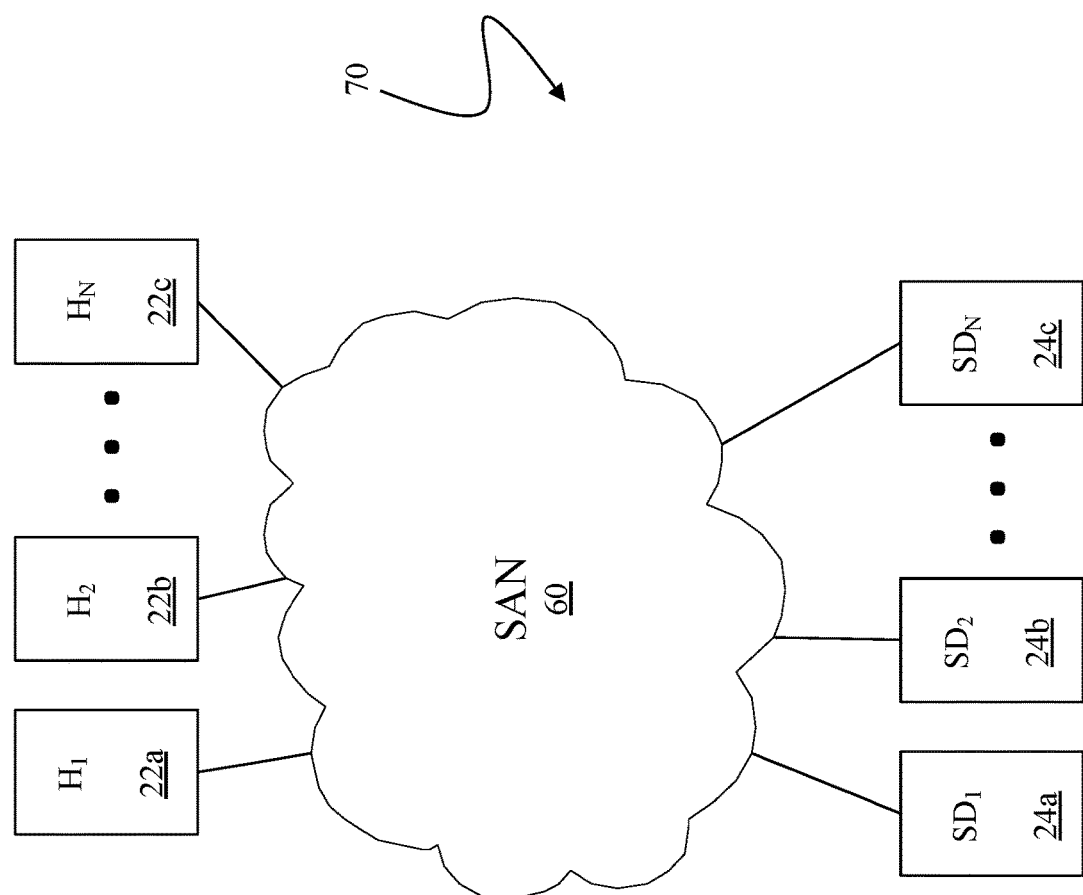
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Referring to FIG. 4, a diagram 400 shows the host 22 and the storage system 24, described above, along with a backup storage system 24' that emulates a tape drive. The backup storage system 24' provides functionality similar to tape drive simulation devices provided by Dell EMC, such as the DLm 8500 R5 model tape emulation device. The host 22 provides tape commands and data to the backup storage system 24' and the backup storage system 24' responds to the host 22 by providing conventional tape drive status information and data. Thus, applications on the host 22 that are written to exchange data with a tape drive may exchange data with the backup storage system 24'. In operation, the host 22 may exchange production data with the storage system 24 and may exchange backup data with the backup storage system 24'.

The backup storage system 24' is like the storage system 24, but includes a connection component 402 and a smart network interface controller 404 that communicates with the connection component 402 and with possibly other components of the backup storage system 24', as explained in more detail elsewhere herein. The connection component 402, which may be a conventional FICON connection component or any other appropriate type of connection component, provides connectivity between the host 22 and the backup storage system 24'. In an embodiment herein, the smart network interface controller 404 is a BlueField® SmartNIC device provided by Mellanox Technologies of Sunnnyvale Calif., although other appropriate smart network interface devices could be used instead, including devices provided by other vendors such as Broadcom, Eternity Networks, Marvel, Napatech/Intel, Netronome, Solarflare, and Huawei. The smart network interface controller 404 includes a system on a chip having a processor, memory, non-volatile storage, etc. where the processor may be programmed to provide significant functionality. In an embodiment herein, the smart network interface controller 404 is programmed to provide the same or similar functionality as components of a Dell EMC DLm tape emulation device, including a front end component and a data mover component. In some cases, software used for the front end component and the data mover component of a conventional DLm device from Dell EMC may be ported to the smart network interface controller 404. Thus, the host 22 may use conventional/legacy software that exchanges data with a tape device to exchange data with the backup storage system 24', which may be implemented using a conventional storage system without any additional components that may otherwise be associated with a tape drive emulation device.

Referring to FIG. 5, a director board 500 is shown in detail as including the connection component 402 and the smart network interface controller 404. Communication between the connection component 402 and the smart network interface controller 404 is provided by a PCIe bus 502 that also provides communication for other components of the director board 500, including a processor 504 and a disk interface 506. Note that it is possible to use one or more different mechanisms to provide communication for the components of the director board, including any appropriate on-board interconnection bus or fabric, such as Gen-Z. There may be other components on the director board 500 (not shown), such as one or more additional processors, non-volatile memory, RAM, etc. The disk interface 506 controls one or more of the physical storage units like the physical storage units 33a-33c of the storage system 24, described above, by exchanging control/status information and data therewith.

Tape data that is exchanged between the host 22 and the backup storage device 24' passes through the connection component 402, the smart network interface controller 404 and the disk interface 506 to be stored on and read from the physical storage units of the backup storage device 24'. In some embodiments, the processor 504 is used to read and write data from and to the smart network interface controller 404 and the connection component 402. Thus, for example, data that is received from the host 22 is passed from the connection component 402 to the smart network interface controller 404 and is then read from the smart network interface controller 404 by the processor 504 that transfers the data to the disk interface 506. The disk interface 506 transfers the data to the storage units of the backup storage device 24'. In other embodiments, a P2P (PCIe peer copy) transfer is initiated between the smart network interface controller 404 and the disk interface 506. The P2P transfer allows data to be transferred directly between the smart network interface controller 404 to the disk interface 506 without using the processor 504 (or any other processor). Other types of direct data transfer between the smart network interface controller 404 and the disk interface 506 may also be used.

Figure 6:
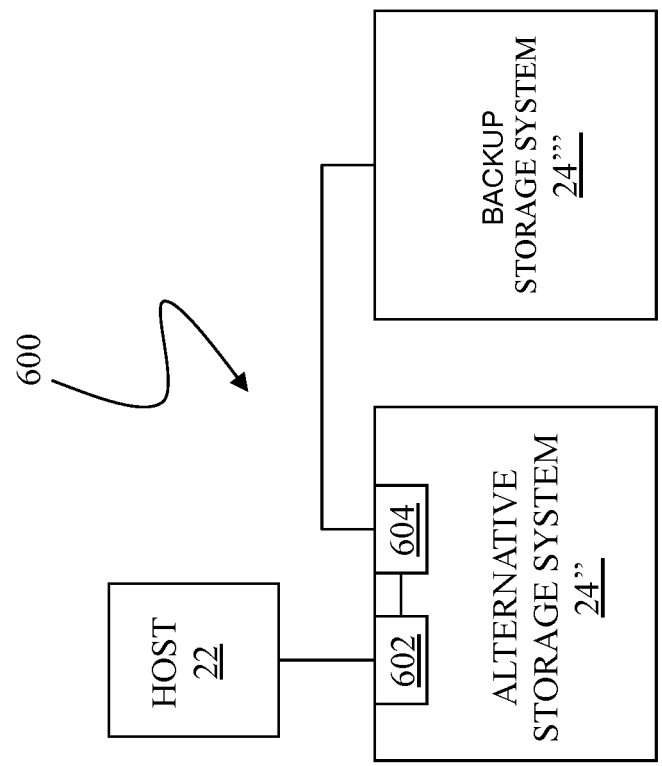
FIG. 6 is a schematic diagram showing a host, a storage system and an alternative backup storage system according to an embodiment of the system described herein.

Referring to FIG. 6, a diagram 600 illustrates an alternative embodiment where the host 22 is coupled to an alternative storage system 24" that includes a connection component 602 and a smart network interface controller 604 that are like the connection component 402 and the smart network interface controller 404, discussed above. In the embodiment of FIG. 6, the host 22 may exchange both production data and backup data with the alternative storage system 24" via the connection component 602 where the connection component 602 presents two separate logical interfaces to the host 22: a first logical interface for exchanging production data that is stored on the alternative storage system 24" and a second logical interface for exchanging backup data stored on the backup storage system 24'".

The smart network interface controller 604 is programmed to interact with the connection component 602 to provide the second logical interface to the host 22. In an embodiment herein, the smart network interface controller 604 may be programmed to cause the connection component 602 to provide functionality similar to components of a Dell EMC DLm tape emulation device, including a front end component and a data mover component thereof. Of course, the smart network interface controller 604 could be programmed to cause the connection component 602 to provide different functionality and/or to cause the connection component 602 to present a different logical interface to the host 22. In operation, the host 22 exchanges production data with the alternative storage system 24" using a first logical interface and exchanges backup data with the alternative storage system 24" using a second logical interface different from the first logical interface.

For backup data that is exchanged between the host 22 and the alternative storage system 24", the smart network interface controller 604 causes the data to be transferred to the backup storage system 24'". The transfer may occur using processing provided by the smart network interface 604 without using any other processors of the alternative storage system 24". That is, the transfer is performed exclusively using one or more processors provided as part of the smart network interface controller 604 and thus not using any other processor(s) that may have been provided with the alternative storage system 24". In some embodiments, the backup storage system 24'" may be implemented using a conventional storage system such as the storage system 24 discussed elsewhere herein. In such a case, the backup storage system 24'" may receive data using a conventional connection, such as a FICON connection. In other embodiments, the alternative storage system 24" and the backup storage system 24'" may be interconnected using an Internet connection or a PCIe connection where the backup storage system 24'" also has a smart network interface (not shown) to communicate with the alternative storage device 24".

It is also possible to provide a mechanism where the host 22 does not exchange backup data with the alternative storage device 24". Instead, the smart network interface controller 604 is programmed to handle transferring backup data to the backup storage device 24'". In some cases, the program on the smart network interface controller 604 transfers, to the backup storage system 24'", all data that is written by the host 22 to the alternative storage system 24". In other cases, the smart network interface controller 604 may selectively transfer data from the alternative storage system 24" to the backup storage system 24'". The selective transfer may use any criteria. For example, the data to be transferred may be specially marked or otherwise indicated by the host 22. Alternatively, the smart network interface controller 604 may be programmed to recognize and/or determine particular data to transfer from the alternative storage system 24" to the backup storage system 24'".

Figure 7:
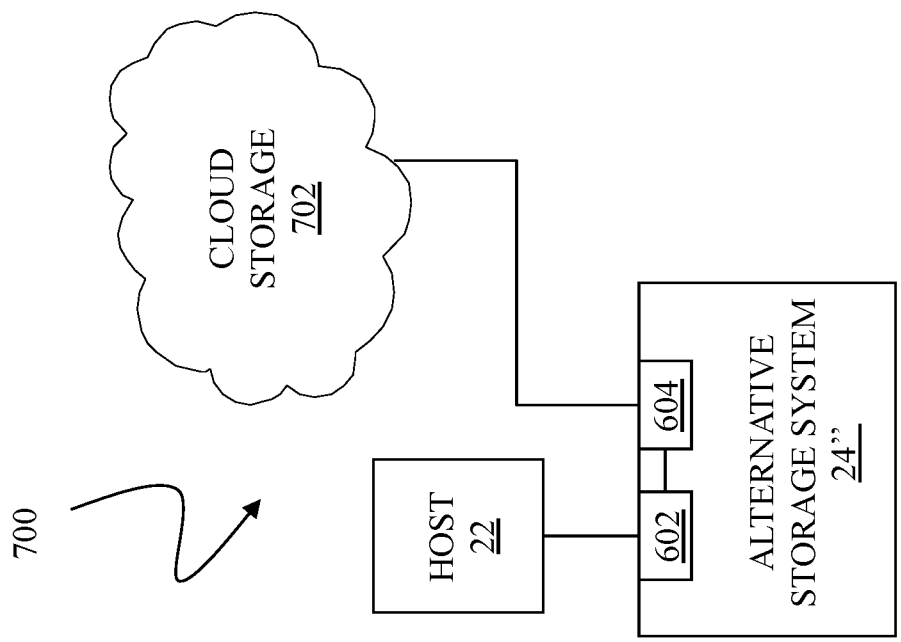
FIG. 7 is a schematic diagram showing a host, a storage system and a cloud storage system according to an embodiment of the system described herein.

Referring to FIG. 7, a diagram 700 illustrates an embodiment where the smart network interface controller 604 is coupled to a cloud storage 702. The cloud storage 702 may be a private cloud storage provided by an organization for its own internal use, a semi-private cloud storage provided by a collection of organizations for use by members, or a public cloud storage such as Amazon Web Service (AWS) or Microsoft Azure. The cloud storage 702 provides security controls so that only authorized users may access data and possibly so that it is possible for some of the users to only be able to read data. In an embodiment herein, the cloud storage 702 may be accessible from any location via the World Wide Web, although it may be possible to impose restrictions on access, such as geographic restrictions (e.g., prohibiting access from Internet addresses originating in certain countries). In other embodiments, the cloud storage 702 may be part of a private network that is not generally accessible, but may nonetheless be geographically diverse.

The connection component 602 may present two separate logical interfaces to the host 22: a first logical interface for exchanging production data that is stored on the alternative storage system 24" and a second logical interface for exchanging backup data stored on the backup storage system 24'". The smart network interface controller 604 is programmed to interact with the connection component 602 to provide the second interface to the host 22 where the host 22 accesses the cloud storage 702 using the second interface. The smart network interface controller 604 may be programmed to cause the connection component 602 to provide functionality similar to components of a Dell EMC DLm tape emulation device, including a front end component and a data mover component so that tape data reads and writes by the host 22 actually exchange data with the cloud storage 702. Of course, the smart network interface controller 604 could be programmed cause the connection component 602 to provide different functionality and/or to cause the connection component 602 to present a different logical interface to the host 22 that allows access by the host 22 to the cloud storage 702. In some instances, the host 22 may exchange production data with the alternative storage system 24″ using a first logical interface and exchange backup data with the cloud storage 702 using a second logical interface different from the first logical interface.

It is also possible to provide a mechanism where the host 22 exchanges data with the alternative storage device 24″ and the alternative storage device 24″ uses the smart network interface controller 604 to exchange data with the cloud storage 702. In some cases, a program on the smart network interface controller 604 transfers, to the cloud storage 702, all data that is written by the host 22 to the alternative storage system 24″. In other cases, the smart network interface controller 604 may selectively transfer data from the alternative storage device 24″ to the cloud storage 702. The selective transfer may use any criteria. For example, the data to be transferred may be specially marked or otherwise indicated by the host 22. Alternatively, the smart network interface controller 604 may be programmed to recognize and/or determine particular data to transfer from the alternative storage system 24″ to the cloud storage 702.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A backup data storage system, comprising:
   non-volatile memory units;
   an interface to an other storage system that is separate from and external to the backup data storage system; and
   a director board, coupled to at least some of the non-volatile memory units to exchange data therewith, the director board including:
      a disk interface coupled to at least some of the non-volatile memory units;
      a connection component that provides two logical interfaces to a host coupled to the backup data storage system, a first logical interface receiving data provided by the host to be stored at the backup data storage system using the disk interface and a second logical interface to exchange data the host that is received from and sent to the other storage system; and
      a smart network interface controller, coupled to the disk interface and to the connection component to provide tape emulation to the host via the second logical interface of the connection component, wherein the smart network interface controller receives tape commands and tape data provided by the host to the second logical interface and, in response thereto, transfers the tape data to the other storage system using the interface to the other storage system and the smart network interface controller receives, via the interface to the other storage system, corresponding tape status information in response thereto and provides the corresponding tape status information to the host using the second logical interface of the connection component.

2. A backup storage system, according to claim 1, wherein the disk interface, the connection component, and the smart network interface controller are coupled using a PCIe bus.

3. A backup data storage system, according to claim 1, wherein the data is transferred directly between the smart network interface controller and the disk interface using P2P protocol that transfers data using a PCIe bus.

4. A backup storage system, according to claim 1, wherein the smart network interface controller includes a system on a chip having a processor, memory, and non-volatile storage.

5. A backup storage system, according to claim 1, wherein the connection component is an ANSI FC-SB-3 Single-Byte Command Code Sets-3 Mapping Protocol for Fibre Channel connection.

6. A backup storage system, according to claim 1, wherein the smart network interface controller selectively transfers data that is specially marked to the other storage system.

7. A backup storage system, according to claim 1, wherein the smart network interface controller is programmed to recognize and/or determine particular data to transfer to the other storage system.

8. A director board for a storage system, comprising:
   a connection component that provides two logical interfaces to a host coupled to the connection component, a first logical interface receiving data provided by the host for storage on the storage system and a second logical interface to exchange data with a backup storage system that is separate from and external to the storage system; and
   a smart network interface controller, coupled to the connection component to provide tape emulation to the host via the second logical interface and having an interface coupled to the backup storage system, wherein the smart network interface controller receives tape commands and tape data provided by the host to the second logical interface and, in response thereto, transfers the tape data to the backup storage system using the interface coupled to the backup storage system and the smart network interface controller receives, via the interface coupled to the backup storage system, corresponding tape status information in response thereto and provides the corresponding tape status information to the host using the second logical interface of the connection component.

9. A director board for a storage system, according to claim 8, wherein the smart network interface controller includes a system on a chip having a processor, memory, and non-volatile storage.

10. A director board for a storage system, according to claim 8, wherein the connection component is an ANSI FC-SB-3 Single-Byte Command Code Sets-3 Mapping Protocol for Fibre Channel connection.

11. A director board for a storage system, according to claim 8, wherein the smart network interface controller selectively transfers data that is specially marked to the backup storage system.

12. A director board for a storage system, according to claim 8, wherein the smart network interface controller is programmed to recognize and/or determine particular data to transfer to the backup storage system.

13. A director board for storage system, comprising:
a connection component that provides two logical interfaces to a host coupled to the connection component, a first logical interface receiving data provided by the host for storage on the storage system and a second logical interface to exchange data with a cloud storage system that is separate from and external to the storage system; and
a smart network interface controller, coupled to the connection component to provide tape emulation to the host via the second logical interface and having an interface coupled to the cloud storage, wherein the smart network interface controller receives tape commands and tape data provided by the host to the second logical interface and, in response thereto, transfers the tape data to the cloud storage system using the interface coupled to the cloud storage system and the smart network interface controller receives, via the interface coupled to the cloud storage system, corresponding tape status information in response thereto and provides the corresponding tape status information to the host using the second logical interface of the connection component.

14. A director board for a storage system, according to claim 13, wherein the smart network interface controller includes a system on a chip having a processor, memory, and non-volatile storage.

15. A director board for a storage system, according to claim 13, wherein the connection component is an ANSI FC-SB-3 Single-Byte Command Code Sets-3 Mapping Protocol for Fibre Channel connection.

16. A director board for a storage system, according to claim 13, wherein the smart network interface controller selectively transfers data that is specially marked to the backup storage system.

17. A director board for a storage system, according to claim 13, wherein the smart network interface controller is programmed to recognize and/or determine particular data to transfer to the cloud storage system.

* * * * *